United States Patent
Arechiga et al.

(10) Patent No.: US 12,302,918 B2
(45) Date of Patent: May 20, 2025

(54) METHOD FOR MAKING CHEESE FROM ULTRA-FILTERED MILK

(71) Applicants: GLANBIA NUTRITIONALS LIMITED, Kilkenny (IE); Valerie Arechiga, Twin Falls, ID (US); Maren Long, Pasadena, CA (US); David Perry, Twin Falls, ID (US); Loren Ward, Twin Falls, ID (US)

(72) Inventors: Valerie Arechiga, Twin Falls, ID (US); Maren Long, Pasadena, CA (US); David Perry, Twin Falls, ID (US); Loren Ward, Twin Falls, ID (US)

(73) Assignee: GLANBIA NUTRITIONALS LIMITED, Kilkenny (IE)

( * ) Notice: Subject to any disclaimer, the term of this patent is extended or adjusted under 35 U.S.C. 154(b) by 358 days.

(21) Appl. No.: 17/913,419

(22) PCT Filed: Mar. 22, 2021

(86) PCT No.: PCT/US2021/023524
§ 371 (c)(1),
(2) Date: Sep. 21, 2022

(87) PCT Pub. No.: WO2021/194990
PCT Pub. Date: Sep. 30, 2021

(65) Prior Publication Data
US 2023/0142884 A1 May 11, 2023

Related U.S. Application Data

(60) Provisional application No. 62/993,057, filed on Mar. 22, 2020.

(51) Int. Cl.
*A23C 19/064* (2006.01)
*A23C 19/032* (2006.01)

(52) U.S. Cl.
CPC ........ *A23C 19/0326* (2013.01); *A23C 19/064* (2013.01)

(58) Field of Classification Search
CPC .................. A23C 19/064; A23C 19/0326
See application file for complete search history.

(56) References Cited

U.S. PATENT DOCUMENTS 3,105,764 A 10/1963 Wagner
3,295,991 A * 1/1967 Cort ..................... A23C 19/063
426/38

(Continued)

FOREIGN PATENT DOCUMENTS

EP 0159303 A2 10/1985
WO WO-0013519 A1 * 3/2000 ......... A23C 19/0323
WO WO-2004032641 A1 * 4/2004 ........... A23C 19/063

OTHER PUBLICATIONS

Fox, Exogenous Enzymes in Dairy Technology from Handbook of Food Enzymology, CRC Press, 2003, pp. 279-302 (Year: 2003).*

(Continued)

*Primary Examiner* — Changqing Li
(74) *Attorney, Agent, or Firm* — Viksnins Harris Padys Malen LLP

(57) ABSTRACT

Disclosed is a method for improving the conversion properties and decreasing ripening time of cheese made from ultra-filtered milk and/or concentrated milk, the method comprising applying chymosin to cheese curds during the cheesemaking process.

7 Claims, 7 Drawing Sheets

(56) References Cited

U.S. PATENT DOCUMENTS

| | | | |
|---|---|---|---|
| 5,180,596 A | * | 1/1993 | Yokoyama ........... A23C 19/063 426/43 |
| 5,547,691 A | | 8/1996 | Kjaer et al. |
| 6,120,809 A | | 9/2000 | Rhodes |
| 2003/0185938 A1 | | 10/2003 | De et al. |

OTHER PUBLICATIONS

Kanawjia, Cheese Technology [Online], published 2016, [retrieved on Nov. 7, 2024]; retrieved from the Internet: <URL: https://www.agrimoon.com/wp-content/uploads/CHEESE-TECHNOLOGY.pdf (Year: 2016).*

Patent Cooperation Treaty, International Search Report and Written Opinion for PCT/US2021/023524, 6 pages, dated Jun. 8, 2021.

* cited by examiner

METHOD FOR MAKING CHEESE FROM ULTRA-FILTERED MILK

CROSS-REFERENCE TO RELATED APPLICATION(S)

This application is a 35 U.S.C § 371 application of International Application No. PCT/US2021/023524, filed on Mar. 22, 2021, which claims priority to U.S. Provisional Application No. 62/993,057, filed on Mar. 22, 2020. The contents of each of these applications are incorporated by reference herein.

FIELD OF THE INVENTION

The invention relates to methods for making cheese. More specifically, the invention relates to methods for making cheese from ultra-filtered milk and/or concentrated milk with improved slicing and shredding properties.

BACKGROUND OF THE INVENTION

Processes for making cheese can be varied to account for the tremendous variety of cheeses on the market. However, there are generally six basic steps involved in cheesemaking: acidification, coagulation, cutting (of curds, to release whey), salting, shaping, and ripening. Acidification can be achieved using chemical means, biological means (addition of cultures that convert lactose to lactic acid, for example), or a combination of both.

Caseins are group of proteins which make up the largest percentage of milk protein, and are present in milk in the form of micelles. Caseins are precipitated by acid and by rennet, so in the coagulation step rennet is added to the acidified cheese milk. One group of molecules making up the casein micelle (the kappa caseins) are located on the outer part of the micelle and are negatively charged. The negatively-charged kappa caseins on the outside of one casein micelle repel other casein micelles because they also have negatively-charged kappa caseins on their surfaces. As long as those interactions are maintained, milk remains in its liquid form, with the casein dispersed within it. However, rennet (chymosin) enzymatically cuts the negatively-charged kappa-casein, removing the negative end of the molecule. Removal of the negatively-charged end of kappa-casein produces para-kappa-casein, which is relatively unstable and interacts with milk minerals (phosphate and calcium) to form a bridge that joins the casein micelles together, creating a protein web that traps whey, fats, minerals, and enzymes (e.g., rennet). To separate the curd (the web of casein proteins) from the whey, the curd is physically cut and retained for completion of the cheesemaking process, while the whey is drained off. Although some rennet is trapped in the coagulated casein, much of it will be lost when the whey is removed.

Cheese is salted to enhance the flavor, as a natural preservative, and to control loss or retention of moisture in the curd. The salted, cut curds that have been separated from the liquid whey can then be shaped, by pressing them into forms where the curds can knit together. Through a process known as ripening, which involves a variety of enzymatic processes (e.g., glycolysis, lipolysis, proteolysis), the texture and flavor of the cheese develops over time.

In dairy processing, ultrafiltration of milk retains macromolecules and particles larger than about 0.001-0.02 micrometers, including casein and whey proteins, while some of the lactose, minerals, and water-soluble vitamins present in milk are removed along with water in the permeate. Ultra-filtered (UF) milk has a higher casein concentration—which impacts both the rate of coagulation and coagulation firmness.

As rennet modifies the kappa caseins, the higher concentration of casein micelles in UF milk brings more of the casein molecules within close proximity to each other, further promoting gel formation. Therefore, using UF milk in cheesemaking can produce faster and firmer gel set due to the higher casein concentration. However, rennet is also important for the development of cheese texture later in the cheesemaking process. In the beginning stages of proteolysis in ripening, rennet (chymosin) hydrolyzes the alpha s1-casein, resulting in cheese breakdown and softer texture.

Conversion of cheese (i.e., changing the size and shape of cheese by slicing, shredding, etc.) can be performed when the cheese texture is suitable for conversion. However, UF cheese often lags behind in the rate at which it achieves suitable conversion texture as compared to that of regular cheese. This can delay slicing, shredding, or other conversion methods for which cheese texture can be a critical factor. The delayed development of suitable texture for conversion reduces the attractiveness of using UF milk in cheesemaking on a large scale because storing cheese through an extended ripening process requires a considerable investment in time, space, and energy costs to maintain the cheese under the appropriate environmental conditions.

Efforts have been made to incorporate sufficient amounts of rennet into cheese milk, or the cheese gel, to enhance ripening and reduce the time required to achieve the requisite texture for conversion. However, because of the unique characteristics of UF milk such as increased casein concentration, the first option—adding extra rennet at the beginning of the cheesemaking process—has not proven to be a way to retain a sufficient amount or concentration of rennet in the cheese to improve ripening. Too much rennet in the cheese milk can produce gels that are too brittle, or gels that barely form at all. In actual practice, it is generally considered to be better to add less rennet to UF milk than is added to regular milk. Another option was disclosed in U.S. Patent Application Publication Number 20030185938, which describes trapping rennet inside a hydrocolloid matrix so that it can be released at a later stage in cheesemaking. This can result in added expense due to the need to produce or buy a special rennet preparation, and adds ingredients to cheese milk that can create "clean label" issues, as well as concerns regarding Standard of Identity requirements.

U.S. Pat. No. 6,120,809 (Rhodes, K., Sep. 19, 2000) discloses that in the case of "enhancing agents," such as proteolytic and/or lipolytic enzymes, for use in cheesemaking by standard methods, "[w]hen applied to the surface of the cheese curds, there is a lack of penetration that provides inconsistency in [the] final product" (Column 12, lines 17-19). Rhodes' solution to the problem of penetration of enhancing agents into the cheese curd was an "infuser," disclosing that "as the infuser rotates, the mixture of cheese curds and enhancing agent are subjected to a negative pressure, thereby causing the enhancing agent to infiltrate the curds" (Column 11, lines 19-22). However, this approach involves added—and potentially costly—equipment and associated increased energy costs.

So, what are still needed are better methods for improving the ripening and texture development of UF cheeses to make them more commercially useful by shortening the time from cheesemaking to cheese conversion.

SUMMARY OF THE INVENTION

The invention provides a method for improving the conversion properties and decreasing the ripening time of cheese made from ultra-filtered milk, the method comprising applying, at an atmospheric pressure of at least about 28.5 inches, at least one rennet solution to the surface of cheese curds formed during a cheesemaking process. In various aspects of the method, the step of applying at least one rennet solution comprises spraying the at least one rennet solution onto the cheese curds. In various aspects of the method, the rennet is applied at a concentration of from about 0.01 percent to about 1 percent (w/w).

In various aspects of the method, the step of applying the at least one rennet solution comprises applying the at least one rennet solution by a method selected from the group consisting of spraying the at least one rennet solution on the cheese curds, soaking the cheese curds in the at least one rennet solution, and a combination of both soaking and spraying the at least one rennet solution on the cheese curds.

Various aspects of the invention also include a method for improving the conversion properties and decreasing ripening time of cheese made from ultra-filtered milk, the method comprising the steps of salting and shaping cheese curds to produce at least one shaped un-ripened cheese, crumbling the un-ripened cheese to increase the surface area by producing un-ripened cheese curds from the crumbling, applying rennet to the un-ripened cheese curds, and shaping the un-ripened cheese curds to form at least one shaped cheese.

DETAILED DESCRIPTION

Figure 1:
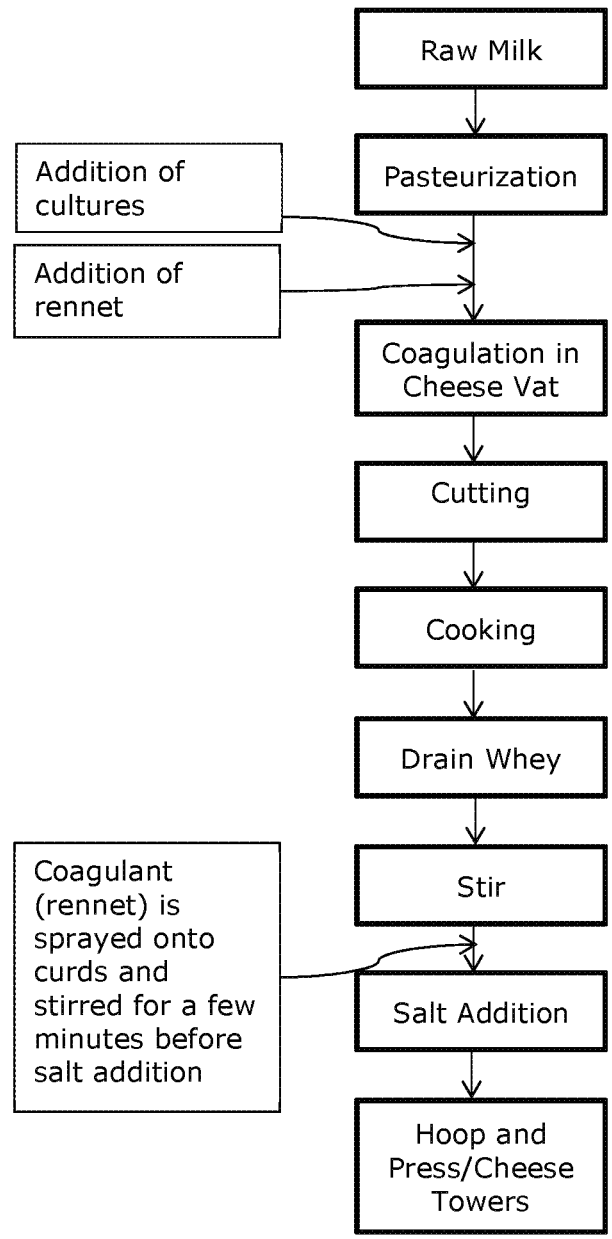
FIG. 1 is a flow diagram of a method for making UF cheese according to the invention.
Figure 2:
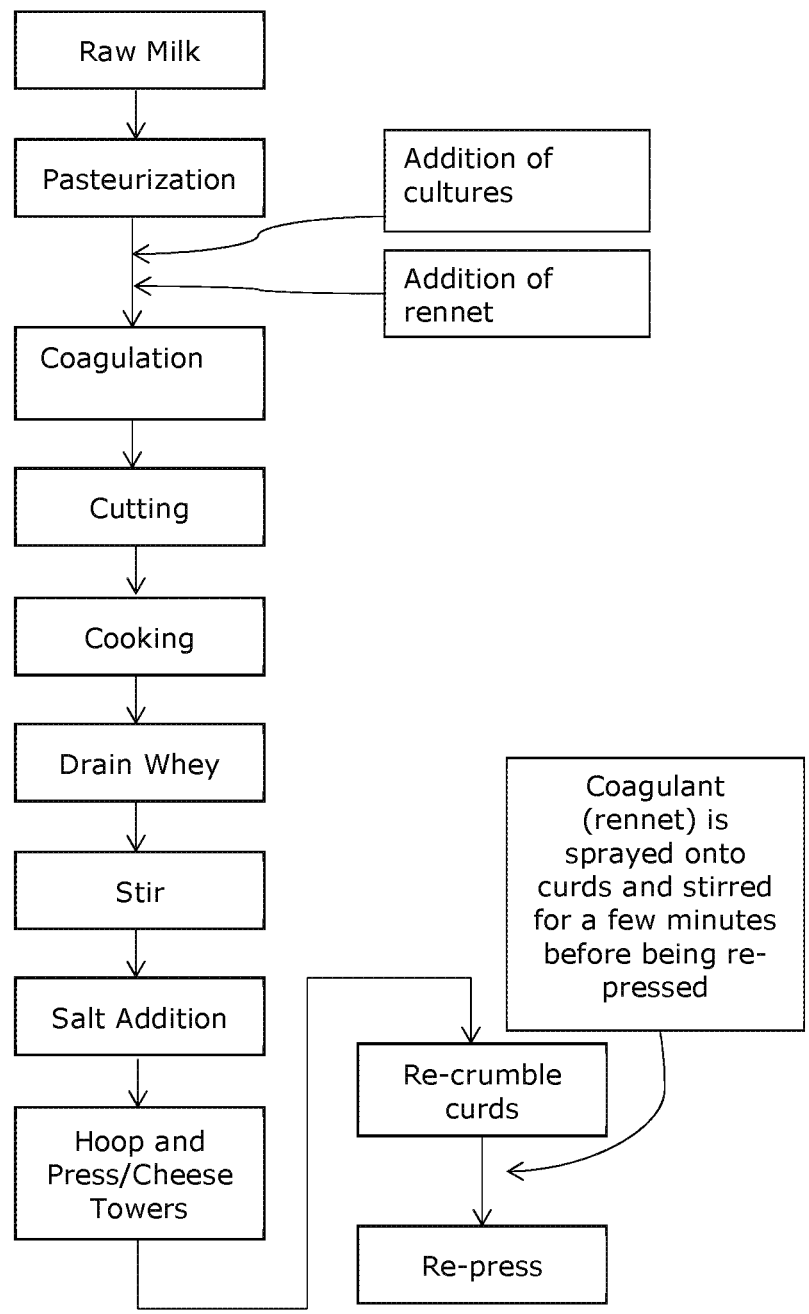
FIG. 2 is a flow diagram of an alternate embodiment of the method for making UF cheese according to the invention.

The inventors have developed a method for improving the conversion properties and decreasing the ripening time of cheese made from ultra-filtered milk, the method comprising applying at least one rennet solution to the surface of cheese curds made from ultra-filtered milk, the application being performed at an environmental pressure of at least about 28.5 inches. In various aspects of the method, the step of applying at least one rennet solution comprises spraying the at least one rennet solution onto the cheese curds. In various aspects of the method, the rennet is applied at a concentration of from about 0.01 percent to about 1 percent (w/w).

"Rennet" and "rennin" are alternate names for the endopeptidase listed as "chymosin" in the MEROPS database, and the terms are used interchangeably herein. "Rennet" is actually a group of enzymes, which can be isolated from calf stomach, produced by fermentation methods, isolated from plants, isolated from fungi or microbes, etc. Within the group of enzymes is chymosin, which is responsible for modifying kappa casein and thereby promoting casein coagulation and curd formation. Rennet is commercially available from several suppliers and is currently sold under tradenames such as Chy-Max® (Pfizer, Inc., US), Hannilase® (Chr. Hansen, Inc. US), Milase® Premium (CSK Food Enrichment B.V., Netherlands), and Maxiren® XDS (Gist-Brocades NV Corporation, Netherlands).

In various aspects of the method, the step of applying the at least one rennet solution comprises applying the at least one rennet solution by a method selected from the group consisting of spraying the at least one rennet solution on the cheese curds, soaking the cheese curds in the at least one rennet solution, and a combination of both soaking and spraying the at least one rennet solution on the cheese curds. The inventors have discovered that, contrary to current thinking by those of skill in the art of cheesemaking, rennet can be applied to the surface of cheese curd(s) to hydrolyze alpha s1-casein and promote the ripening process without requiring chemical additions or mechanical manipulations, such as applying negative pressure (e.g., a vacuum) to the curd. The method of the invention allows for the application of at least one rennet, preferably in the form of at least one rennet solution (e.g., a solution comprising rennet in water), to the surface of cheese curd(s) at an environmental pressure of at least about 28.5 inches. Application of at least one rennet, performed by spraying on the curd(s) at least one rennet solution, by soaking the curd(s) in at least one rennet solution, etc., can readily be performed under standard conditions associated with common cheesemaking protocols. No coating of the rennet to encapsulate it is necessary, nor is it necessary to apply a vacuum (negative pressure) to the curd(s) in order to promote absorption of the rennet applied to the surface of the curd(s).

"Conversion" refers to the processing of cheese by producing slices, shreds, etc., and slicing is generally known to be one of the most difficult methods of cheese conversion. If a cheese slices well, it will generally also be easy to shred. Therefore, when cheesemakers talk about desirable conversion properties of cheese they often refer to the "sliceability" of cheese—i.e., the ability of a cheese processor to cut cheese cleanly into thin slices that resist breakage, resist fracture at the edges of the slices, and can be bent, rolled, etc., to a high level before the slice breaks. The sliceability of cheese is generally related to the chemical and microstructural properties of the casein network that makes up the cheese. Improving conversion properties can therefore be defined as improving texture, sliceability, and/or shredability of cheese and/or decreasing the aging/ripening time needed to achieve suitable texture to facilitate conversion.

Ultrafiltration of milk removes as permeate some of the lactose, minerals, and water-soluble vitamins present in milk, along with water, but leaves the casein and whey proteins in the retentate. The use of UF milk in cheesemaking could provide significant advantages to cheesemakers, because ultrafiltration enables a cheesemaker to better standardize the protein in the cheese, as well as to increase throughput (i.e., increase production efficiency). However, the higher concentration of casein in UF milk means that, given the same amount of time for ripening/aging, cheese made with UF milk ("UF cheese") will lag behind cheese made with regular milk (i.e., "regular cheese"), so UF cheese must be stored longer before it is ready to be converted by slicing, shredding, crumbling, etc. The additional storage time represents significant expense to the cheesemaker or cheese converter, since storage requires space and energy costs that could be decreased if the UF cheese could be converted sooner. The method provided herein by the inventors can be used to change the timing so that UF cheese exhibits a desirable level of sliceability in a shorter time than would UF cheese made using customary cheesemaking methods.

In the method of the invention, rennet is applied to the curd after it is formed in the cheesemaking process, producing cheeses made from ultra-filtered milk that have improved conversion properties such as improved sliceability. These properties can be measured, and comparison between UF cheeses made by the method of the invention and UF cheeses made by traditional methods for making UF cheeses clearly demonstrates the effectiveness of the application of rennet to the cheese curds as they undergo ripening.

Making UF cheese using the method involves performing steps that are commonly used in the cheesemaking process, but adding to those steps a step of applying to the cheese curd at least one rennet, or chymosin, enzyme. The method requires no specialized equipment, adds little extra time for processing, and can be used to minimize the amount of rennet needed for the entire cheesemaking process using UF cheese, by decreasing the perceived need to add as much as possible to the UF cheese milk in order to increase the amount of rennet remaining in the curds and available for promoting ripening and texture development. The amount of rennet, or the activity of rennet remaining in the cheese gel during processing is a function of both the physical retention of rennet in the curd after whey removal, and denaturation, proteolysis, or other damage to the enzyme during the cheese manufacturing process.

In the method of the invention, UF cheese is made by standard cheesemaking processes known to those of skill in the art, with the added step of applying rennet to the cheese curd(s). For example, pre-acidification and/or acidification can be achieved by the addition of chemicals to acidify the cheese milk, by adding a starter culture can be added to UF milk, the starter culture selected from cultures commonly used in cheesemaking because they convert lactose to lactic acid, or a combination of both. (Bacteria in the starter cultures also produce enzymes that can be beneficial in the ripening process.) Next, one or more commercially-available rennet compositions can be added to the acidified UF milk, the rennet serving as a coagulant to promote the coagulation of casein and thereby form the molecular network required to set up a cheese gel. Once the cheese gel has set up as a curd or curds, the curd can be mechanically cut using any one of various means know to those of skill in the art, the process of cutting the curd resulting in the release of the liquid whey (and the loss of some of the enzymes, including rennet). The cut curds can also be cooked at temperatures selected by those of skill in the art of cheesemaking. The curds can be salted, usually by the application of a brine solution, often with gentle stirring. Either before or after the salting step, the inventors have discovered that adding the step of applying to the cheese curds a solution of rennet comprising from about 0.01 percent to about 1 percent rennet (w/w) can be used to decrease the conversion time for cheeses made with UF milk (UF cheese). Rennet can be obtained from a variety of commercial suppliers.

After the rennet application, the curds can be pressed into one or more containers, or "forms," to start the ripening process. During this ripening process the cheese develops its texture and flavor as the result of enzymatic processes that take place over time within the casein network of the cheese curds. By using the method of the invention, the amount of time needed for the development of desirable texture and flavor can be reduced, thereby reducing needed storage time and decreasing the time from initial cheese making to conversion, and marketing, of the cheese produced thereby.

In an alternate embodiment of the method of the invention, the cheese curds can be salted, pressed into one or more forms, and then removed from the form(s) to undergo a crumbling process to separate the curds and break down the formed, but un-ripened cheese. Rennet is applied to the curds from the crumbled un-ripened cheese, and the curds are again formed and pressed with the rennet remaining with the curds.

Application of rennet to the curds can be performed by a variety of methods known to those of skill in the art. One method that is commonly used for the application of compositions during food processing is spraying, which is useful for the application of rennet to the curds, as well. Application of rennet to the cheese curds in the method of the invention does not require specialized conditions, such as application of a vacuum, for example, to produce curds having a sufficient level of rennin incorporated into them to promote texture development. Normal environmental conditions in the cheese processing facility are acceptable and conducive for the development of improved conversion properties in less time using the method of the invention than are exhibited in UF cheese produced by conventional methods.

To determine the amount of rennet to be applied to the cheese curds, a theoretical yield (estimation of final cheese weight) is calculated based on the starting composition of the cheese milk. Rennet should be applied at from about 0.01% to about 1% w/w (calculated from the theoretical yield). For the cheddar described in the examples below, a range of 0.07% to about 0.3% was observed to be very effective. To aid in application, the requisite amount of rennet can be diluted in water (preferably, deionized (DI) water) to form a rennet solution. A 1:10 dilution is very effective, although in various applications of the method suitable rennet solutions can range from undiluted rennet to a 1:1000 dilution.

Inclusion cheeses, like Pepper Jack, can be difficult to convert. Converters often have to wait longer to convert cheeses that contain inclusions. Using the method of the invention, however, cheesemakers can produce cheeses from UF milk that both contain inclusions such as pieces of jalapeno pepper and are ready to slice in an earlier timeframe than would be expected for inclusion cheeses made from UF milk by conventional methods.

It should be understood by those of skill in the art that the method of the invention can be used to prepare cheeses from other forms of milk concentrates having higher casein concentration than that of standard whole or skim milk, as well as UF-milk as disclosed herein. The invention can be further described by means of the following non-limiting examples, and claims. Where the term "comprising" is used, it should be understood that "consisting of" and "consisting essentially of" can alternatively be used.

Examples

Addition of Rennet/Coagulant to Cheese Curds before Salting

Cheddar cheese was made in the Horizontal Cheese Vat (HCV) using a typical natural cheese recipe. Milk was pasteurized and filled into the HCV. Starter cultures were added and allowed to ripen.

Rennet (3% Chy-Max® Extra, CHR. Hansen, Lot No. 3355420) was added to the cheese milk at 40 ml per 1,000 pounds of milk. The milk was left to set, as is typical for natural cheese production. Curds were cut and cooked, and then the whey was drained on a drain table. A rennet solution was then prepared using an amount of enzyme calculated as 0.3% of the total weight of the finished cheese (the theoretical yield). That amount of rennet was diluted in DI water at 1 parts rennet per 10 parts DI water. The rennet solution was applied to the cheese curds by spraying it onto the curds fifteen minutes before salting. After stirring for 15 minutes, salt was applied and cheese was hooped and pressed.

Addition of Rennet/Coagulant to Curds at Re-Crumbling Stage after Salting and Pressing Cheddar cheese was made in the Horizontal Cheese Vat (HCV) using a typical natural cheese recipe. Milk was pasteurized and filled into the HCV. Starter cultures were added and allowed to ripen. Rennet was added to milk and left to set, as is typical for natural cheese production. Curds were cut and cooked, and then the whey was drained on a drain table. Cheese curds were salted, hooped, and pressed. After pressing, curds were crumbled and an additional rennet solution was applied onto the crumbled curds (A solution of 0.3% rennet was diluted in distilled water). Solution was stirred into curds for a few minutes, and then hooped again and re-pressed.

Functional Analysis

The cheeses were evaluated using the Modified Schreiber Melt Test, percentage intact casein, rennet retention tests, slice evaluations, and stretch tests. The Treatment product (with the secondary rennet spray) had a greater melt percentage than the Control product, and more flexibility (better performance in a shorter period of time) in slice evaluations. The Treatment product also had lower percent intact casein and more rennet retention.

Sensory Evaluation and Properties of Finished Cheeses

Sensory evaluation of cheese products—control and treatment (0.07%, 0.12%, or 0.15% rennet added to cheese curds)—was performed by a trained panel at North Carolina State University. Cheese texture attributes were scored on a 0 to 15-point product-specific intensity scale (Spectrum method, Meilgaard, M. C., Giville, G. V., & Carr, B. T. Sensory Evaluation of Techniques (3rd ed.). Boca Raton, FL: CRC Press, 1999). Most cheese flavors fall between 0 and 5. ND—not detected. Results are shown in Table 1. Means in a row followed by different lower letters represent differences among the cheeses (p<0.05).

TABLE 1

Properties of Finished Cheeses

|  | Treatment 0.07% Dosage (8 weeks of age) | Control Cheddar (3 weeks of age) | Treatment 0.15% Dosage (8 weeks of age) | Treatment 0.12% Dosage (3 weeks of age) |
|---|---|---|---|---|
| Hand firmness | 10.6b | 12.6a | 9.8b | 11.8a |
| Hand springiness | 12.4a | 12.8a | 11.7b | 12.8a |
| Hand rate of recovery | 11.6a | 11.7a | 10.8b | 11.4a |
| First bite |  |  |  |  |
| Firmness | 8.6b | 10.5a | 7.6b | 10.4a |
| Fracturability | 5.7b | 8.5a | 4.9b | 7.7a |

TABLE 1-continued

Properties of Finished Cheeses

|  | Treatment 0.07% Dosage (8 weeks of age) | Control Cheddar (3 weeks of age) | Treatment 0.15% Dosage (8 weeks of age) | Treatment 0.12% Dosage (3 weeks of age) |
|---|---|---|---|---|
| Mastication |  |  |  |  |
| Degree of breakdown | 9.6a | 4.0b | 10.1a | 5.2b |
| Cohesiveness | 8.4a | 3.9b | 9.3a | 4.4b |
| Adhesiveness | 7.6a | 4.8b | 8.4a | 5.5b |
| Smoothness of mass | 10.5a | 6.5c | 10.6a | 8.0b |
| After expectoration |  |  |  |  |
| Smoothness mouthcoat | 10.3a | 7.3b | 10.5a | 7.7b |

TABLE 2

Flavor Evaluation

|  | 21 Treatment 0.07% Dosage (8 weeks of age) | Control Cheddar (3 weeks of age) | 21 Treatment 0.15% Dosage (8 weeks of age) | 21 Treatment 0.12% Dosage (3 weeks of age) |
|---|---|---|---|---|
| Diacetyl | 0.7c | 1.8a | 1.2b | 0.8c |
| Salty taste | 3.3b | 3.2b | 3.6a | 3.4ab |
| Sweet taste | 2.0a | 2.0a | 2.0a | 2.0a |
| Umami taste | 2.5a | 2.4a | 2.4a | 2.5a |

Diacetyl is produced naturally as a byproduct of fermentation. It is sometimes added to products to give them a buttery flavor. At lower levels, it gives cheeses, such as Cheddar, a pleasant taste. However, at higher levels the taste can be more of a defect than a benefit in the cheese. At 0.07% dosage at 8 weeks of age and 0.12% dosage at 3 weeks of age, diacetyl levels were significantly better in the treatment cheeses (rennet applied to the curds). At higher dosages of rennet, cheeses exhibited saltier taste.

Slice Data—Control vs Re-Crumbled Pepper Jack (0.15% Dosage)

Two blocks of Pepper Jack cheese were produced at the Glanbia Cheese Twin Falls plant. Within a few hours after the blocks were made, the first block was "re-crumbled" (breaking the block back into curds), the curds were sprayed with 0.15% rennet by weight (Treatment), and then pressed back together. The second block was untouched (Control). Slice data for the two blocks of cheese is shown in Table 3. Comparing the two blocks, the Treatment had better slice scores than the Control at 3 weeks.

TABLE 3

Slice Evaluation - Pepper Jack Cheese

|  | Pepper Jack Control | | Re-crumbled Pepper Jack Treatment- 0.15% | |
|---|---|---|---|---|
| Week | Roll Score | Fold Score | Roll Score | Fold Score |
| 3 | 3 | 4 | 2 | 3 |
| 6 | 2 | 2 | 2 | 2 |
| 7 | 3 | 3 | 2 | 2 |

Figure 3:
FIG. 3 is a photograph of a roll test for cheese made from UF milk by conventional methods, after 3 weeks of ripening.
Figure 4:
FIG. 4 is a photograph of a roll test for cheese made from UF milk by the method of the invention, also after 3 weeks of ripening.
Figure 5:
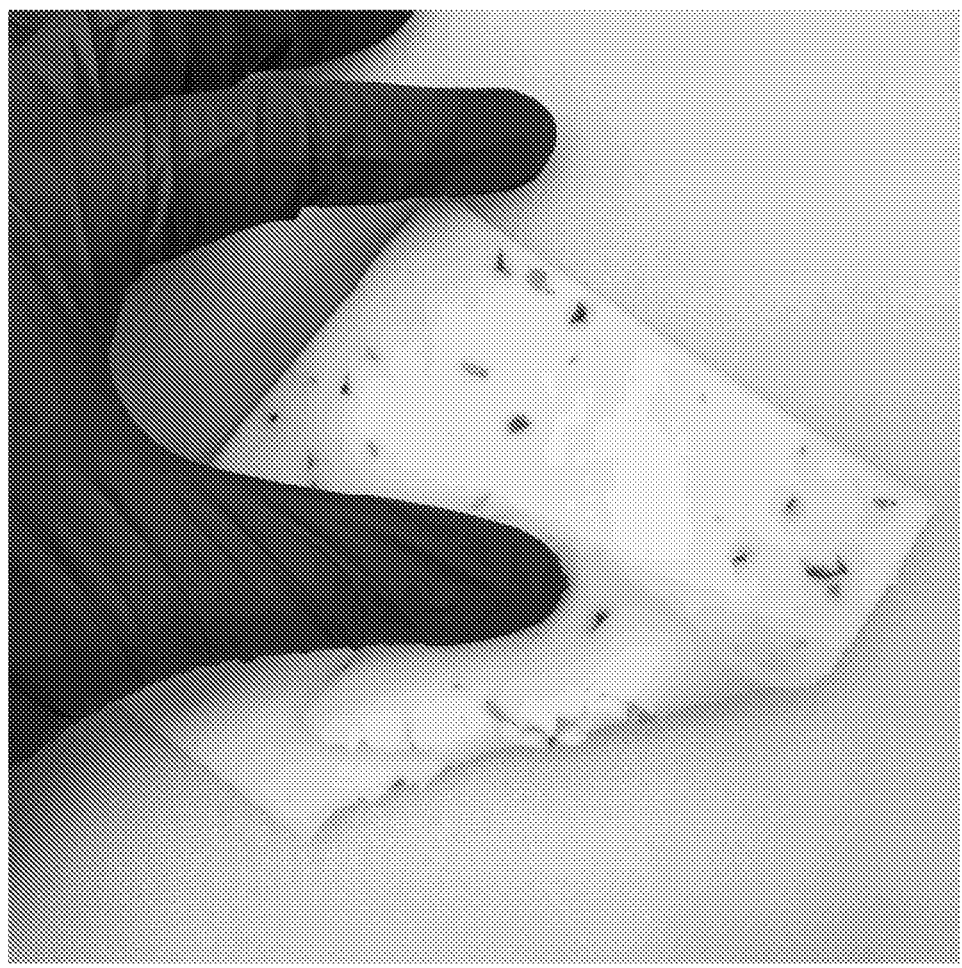
FIG. 5 is a photograph of a fold test for Pepper Jack cheese made from UF milk by conventional methods, after 3 weeks of ripening.
Figure 6:
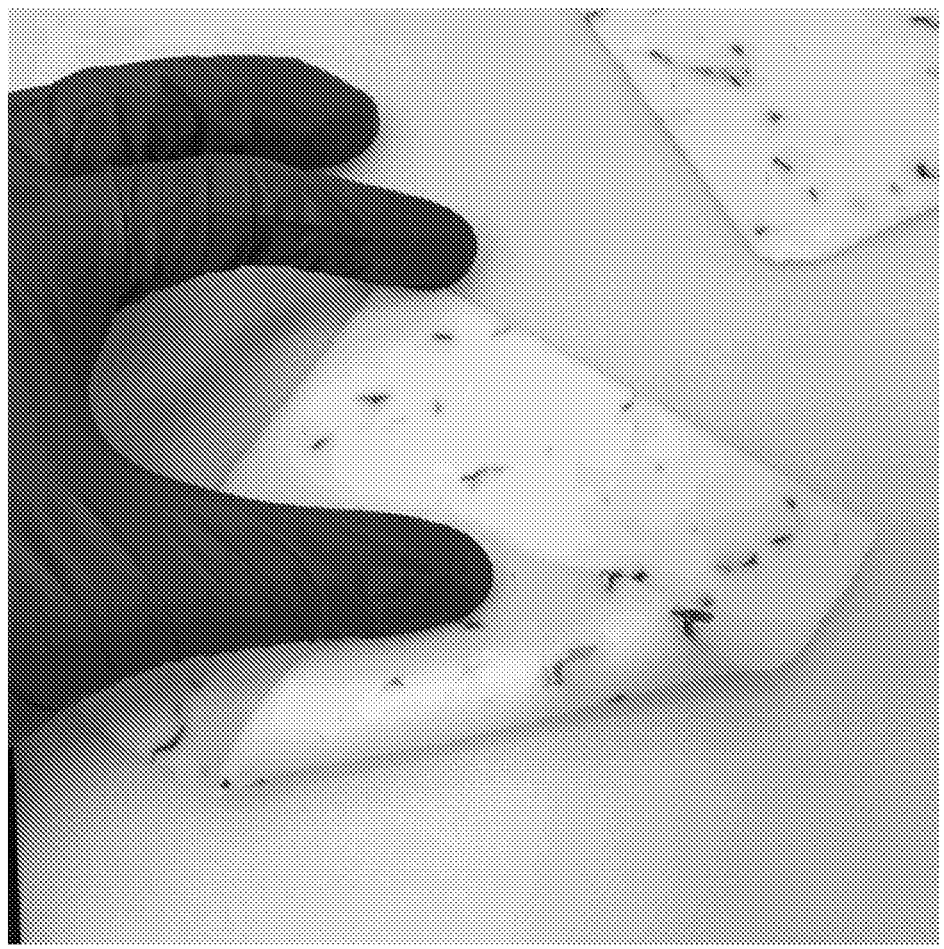
FIG. 6 is a photograph of a fold test for Pepper Jack cheese made from UF milk by the method of the invention (rennet concentration 0.15%), also after 3 weeks of ripening.

The Treatment cheese seen in FIG. 4 demonstrated increased flexibility and rollability in comparison to the Control cheese seen in FIG. 3, as evidenced by the lack of cracking and the ability of the slice to hold the rolled shape. Both cheeses were sliced and evaluated at 3 weeks of age. The inventors evaluated the cheese by the methods below.

UF cheeses were assessed using a fold test, which evaluates the flexibility of a cheese slice. Each corner of a cheese slice was folded over, and the level of damage to the surface of the slice was observed. A "flexible" slice folded and bounced back, with no cracks or breaks, and was given a score of 1. A "slightly flexible" slice folded and generally bounced back, but with slight cracking noted, receiving a score of 2. An "inflexible" slice produced one or more corners that tore or were more significantly cracked, affecting the slice beyond just the surface, and receiving a score of 3. An "unpliable slice" resulted in at least one corner that tore off completely when it was folded, receiving a score of 5.

Slice flexibility was determined using the roll test. A slice was rolled to give an internal diameter of the roll about as wide as a person's thumb. To roll the slice, the tester started with a corner and rolled the cheese slice diagonally. A "very flexible" slice produced no cracks, and the roll could hold in position without additional support, to be given a score of 1. To be given a score of 2, a "flexible" slice rolled with cracks—or without cracks, but not holding its shape/position. An "inflexible" slice did not hold its shape/position, or cracked (score: 3), and an "unpliable" slice would not roll, or ripped completely as it was rolled (score: 5).

Rennet Activity Available During Ripening

Two batches of cheese were compared—cheese made with UF milk by a standard cheesemaking protocol, and cheese made with UF milk by standard methods plus the additional step of applying rennet to the cheese curds. Cheeses were aged for 1 week, then tested for rennet activity. Cheese extract was combined by reconstituted skim milk (RSM) to observe the level of coagulation produced. Cheese resulting from the method of the invention was found to have significantly more rennet activity than did cheese without the application. Furthermore, the level of rennet activity corresponded to the amount of rennet applied to the curd. Results are shown in Table 4 below, where "Trial" represents curds to which rennet had been applied, and "Control" represents curds processed by standard methods. The percentages 0.07 and 0.15 represent rennet application levels.

TABLE 4

Rennet Activity Available During Ripening Aggregation of RSM over Time using Cheese Extract

| Sample | Rep 1 (min) | Rep 2 (min) | Average Minimum | Rennet Units |
|---|---|---|---|---|
| Pepper Jack Control | 112.00 | 112.03 | 112.02 | 4.65E−05 |
| Re-crumbled Pepper Jack Treatment-0.15% | 23.47 | 23.50 | 23.49 | 2.43E−04 |
| Cheddar Control | 76.00 | 76.03 | 76.02 | 7.01E−05 |
| Cheddar Treatment-0.07% | 42.25 | 42.28 | 42.27 | 1.30E−04 |
| Cheddar Treatment-0.15% | 21.17 | 25.87 | 23.52 | 2.43E−04 |

Figure 7:
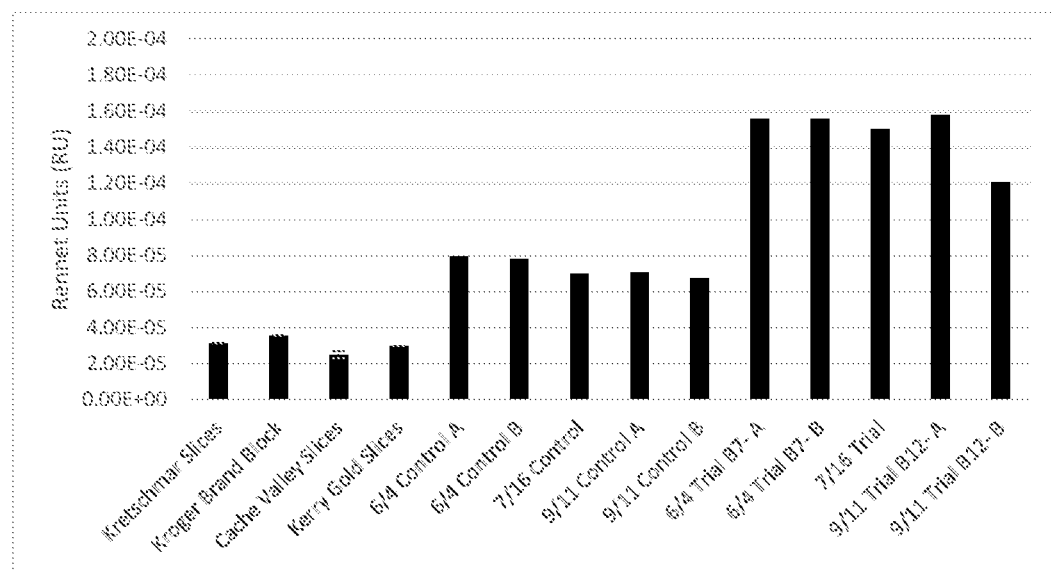
FIG. 7 is a graph illustrating residual rennet activity in ripened cheeses as assessed using the method described by El-Kholy, et al. (El-Kholy, A., et al. Factors Affecting Retention of Rennet in Curd, *J. Agric. Sci. Mansoura Univ.* (2009), 34 (8): 8807-8819). Comparison was performed between commercially-available cheddar cheeses (Kretschmar® slices, Kroger® Brand block, Cache Valley® slices, Kerry Gold® slices), cheddar cheeses produced by the inventors by standard methods using regular milk (6/4 Control A, 6/4 Control B, 7/16 Control, 9/11 Control A 9/11 Control B), and cheddar cheeses produced by the inventors by the method of the invention (6/4 Trial B7-A, 6/4 Trial B7-B, 7/16 Trial, 9/11 Trial B12-A, 9/11 Trial B12-B).

The amount of active rennet retained in cheese (i.e., residual rennet activity) has a direct influence on the development of both texture and flavor during ripening. Residual rennet activity in ripened cheeses was assessed using the method described by El-Kholy, et al. (El-Kholy, A., et al. Factors Affecting Retention of Rennet in Curd, *J. Agric. Sci. Mansoura Univ.* (2009), 34 (8): 8807-8819). Comparison was performed between commercially-available cheddar cheeses (Kretschmar® slices, Kroger® Brand block, Cache Valley® slices, Kerry Gold® slices), cheddar cheeses produced at Glanbia/Southwest Cheese by standard methods using regular milk (6/4 Control A, 6/4 Control B, 7/16 Control, 9/11 Control A 9/11 Control B), and cheddar cheeses produced by the inventors by the method of the invention (6/4 Trial B7-A, 6/4 Trial B7-B, 7/16 Trial, 9/11 Trial B12-A, 9/11 Trial B12-B). Results are shown in Table 5 and in FIG. 7. As FIG. 7 illustrates, residual rennet is highest in the cheeses made by the method of the invention.

TABLE 5

Residual Rennet Activity

| Name | Rep 1 | Rep 2 | Average Rennet Units | Standard Deviation |
|---|---|---|---|---|
| Kretschmar ® Slices | 3.1299E−05 | 3.12985E−05 | 3.12985E−05 | 0 |
| Kroger ® Brand Block | 3.5587E−05 | 3.55866E−05 | 3.55866E−05 | 0 |
| Cache Valley ® Slices | 2.3648E−05 | 2.6431E−05 | 2.49672E−05 | 1.97E−06 |
| Kerry Gold ® Slices | 2.9764E−05 | 2.97643E−05 | 2.97643E−05 | 0 |
| 6/4 Control A | 7.9601E−05 | 7.96014E−05 | 7.96014E−05 | 0 |
| 6/4 Control B | 7.8037E−05 | 7.80375E−05 | 7.80375E−05 | 0 |
| 7/16 Control | 6.9984E−05 | 6.99838E−05 | 6.99838E−05 | 0 |
| 9/11 Control A | 7.0651E−05 | 7.06507E−05 | 7.06507E−05 | 0 |
| 9/11 Control B | 6.7636E−05 | 6.76364E−05 | 6.76364E−05 | 0 |
| 6/4 Trial B7- A | 1.5601E−04 | 1.5601E−04 | 0.000156009 | 0 |
| 6/4 Trial B7- B | 1.5601E−04 | 1.5601E−04 | 0.000156009 | 0 |
| 7/16 Trial | 0.00015038 | 0.000150382 | 0.000150382 | 0 |
| 9/11 Trial B12- A | 0.00015801 | 0.000158014 | 0.000158014 | 0 |
| 9/11 Trial B12- B | 0.00012089 | 0.000120892 | 0.000120892 | 0 |

What is claimed is:

1. A method for improving conversion properties and decreasing ripening time of cheese made from ultra-filtered milk, the method comprising the steps of
   (a) salting and shaping cheese curds made from the ultra-filtered milk to produce at least one shaped un-ripened cheese;
   (b) crumbling the un-ripened cheese to increase the surface area by producing un-ripened cheese curds from the crumbling;
   (c) applying rennet to the un-ripened cheese curds; and (d) shaping the rennet-applied un-ripened cheese curds to form at least one shaped cheese.

2. The method of claim 1 wherein the step of applying the rennet comprises spraying the rennet onto the un-ripened cheese curds.

3. The method of claim 1 wherein the rennet is applied at a concentration of from 0.01 percent to about 1 percent (w/w) of the un-ripened cheese curds.

4. A method for improving conversion properties and decreasing ripening time of cheese made from ultra-filtered milk, the method comprising applying at least one rennet solution to the surface of cheese curds formed from the ultra-filtered milk during cheesemaking, the rennet solution being applied at an atmospheric pressure of at least 28.5 inches of mercury.

5. The method of claim 4 wherein the step of applying the at least one rennet solution comprises applying the at least one rennet solution by a method selected from the group consisting of spraying the at least one rennet solution onto the cheese curds, soaking the cheese curds in the at least one rennet solution, and a combination thereof.

6. The method of claim 4 wherein the step of applying the at least one rennet solution comprises spraying the at least one rennet solution onto the cheese curds.

7. The method of claim 4 wherein the at least one rennet solution is applied at a concentration of from about 0.01 percent to about 1 percent (w/w) of the cheese curds.

\* \* \* \* \*